(12) United States Patent
Proctor

(10) Patent No.: US 10,637,988 B2
(45) Date of Patent: Apr. 28, 2020

(54) SYSTEM, DEVICE AND METHOD FOR GENERATING COMMON ACTUATABLE OPTIONS THAT INITIATE A PLURALITY OF ACTIONS

(71) Applicant: MOTOROLA SOLUTIONS, INC., Chicago, IL (US)

(72) Inventor: Lee M. Proctor, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/645,725

(22) Filed: Jul. 10, 2017

(65) Prior Publication Data

US 2019/0014212 A1 Jan. 10, 2019

(51) Int. Cl.
| | |
|---|---|
| *H04M 3/51* | (2006.01) |
| *H04Q 3/00* | (2006.01) |
| *H04M 3/523* | (2006.01) |
| *G06Q 10/06* | (2012.01) |
| *G06Q 50/26* | (2012.01) |

(52) U.S. Cl.
CPC ........ *H04M 3/5191* (2013.01); *G06Q 10/063* (2013.01); *G06Q 50/26* (2013.01); *H04M 3/523* (2013.01); *H04Q 3/0016* (2013.01); *H04M 3/5237* (2013.01); *H04M 2242/04* (2013.01); *H04M 2242/06* (2013.01); *H04M 2242/14* (2013.01)

(58) Field of Classification Search
CPC .. H04M 3/5191; H04M 3/523; H04M 3/5237; H04M 2242/04; H04M 2242/06; H04M 2242/14; H04Q 3/0016

USPC .................................................... 379/266.02
See application file for complete search history.

(56) References Cited

U.S. PATENT DOCUMENTS

| | | | |
|---|---|---|---|
| 6,192,118 B1 * | 2/2001 | Bayless ............... | H04M 1/2473 379/201.01 |
| 8,396,002 B2 * | 3/2013 | Marshall-Wilson .... | H04L 45/00 370/252 |
| 2004/0172621 A1 * | 9/2004 | Guillorit ............... | H04N 7/106 717/120 |

(Continued)

FOREIGN PATENT DOCUMENTS

EP 2520077 B1 7/2012

OTHER PUBLICATIONS

ISA/EP, International Search Report and Written Opinion, dated Oct. 11, 2018, re PCT International Patent Application No. PCT/US2018/038257.

*Primary Examiner* — Ahmad F. Matar
*Assistant Examiner* — Jirapon Intavong
(74) *Attorney, Agent, or Firm* — Perry + Currier, Inc.

(57) ABSTRACT

A system, device and method for generating common actuatable options that initiate a plurality of actions is provided. Interfaces are identified at the one or more display devices, each of the interfaces comprising a respective actuatable option which, when actuated, initiates a respective action, each respective actuatable option having a label. The interfaces are determined to be associated using one or more of: the labels of the respective actuatable options; and the respective actions. In response to determining that the interfaces are associated, a common actuatable option is generated at the one or more display devices, which, when actuated, initiates the respective actions.

13 Claims, 11 Drawing Sheets

(56) References Cited

U.S. PATENT DOCUMENTS

| | | | |
|---|---|---|---|
| 2008/0072148 A1* | 3/2008 | Walter | H04M 1/72583 |
| | | | 715/700 |
| 2013/0297364 A1 | 11/2013 | Putra et al. | |
| 2014/0241340 A1* | 8/2014 | Seligmann | H04M 9/003 |
| | | | 370/352 |
| 2014/0245228 A1 | 8/2014 | Audet | |
| 2016/0189404 A1 | 6/2016 | Edge et al. | |
| 2016/0198313 A1 | 7/2016 | Sowa et al. | |
| 2016/0371052 A1* | 12/2016 | Berkowitz | G06Q 10/10 |

\* cited by examiner

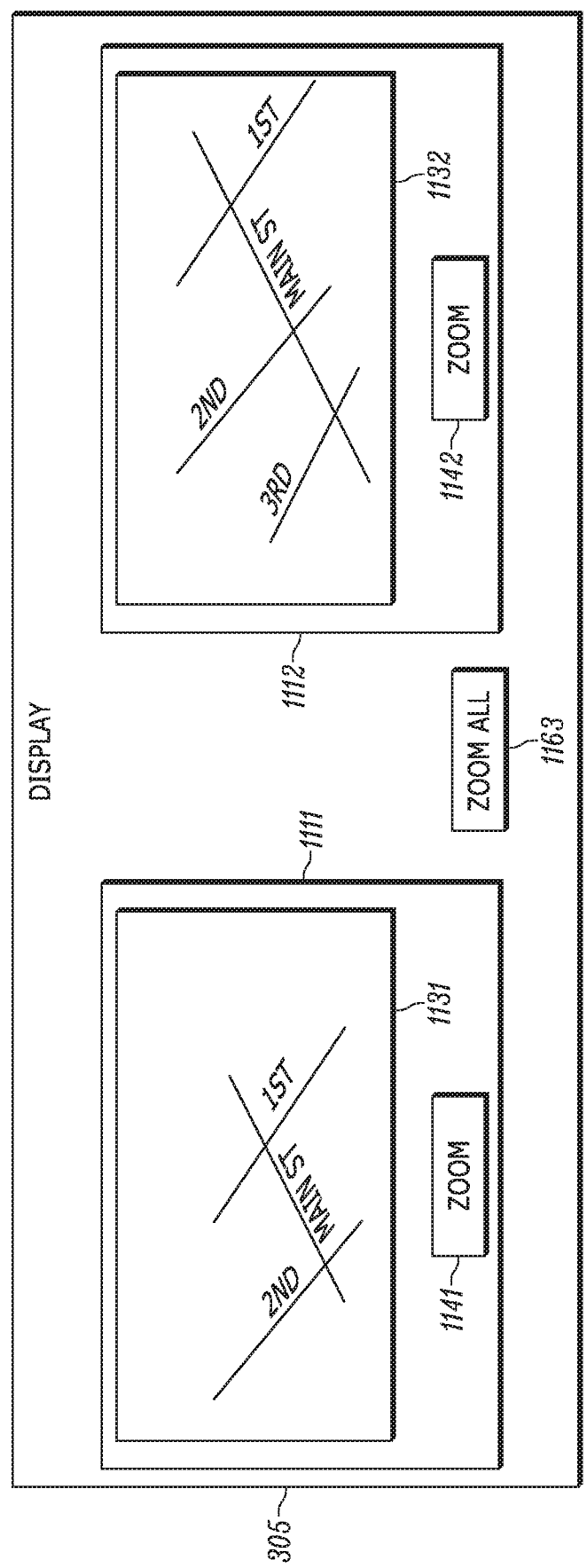

SYSTEM, DEVICE AND METHOD FOR GENERATING COMMON ACTUATABLE OPTIONS THAT INITIATE A PLURALITY OF ACTIONS

BACKGROUND OF THE INVENTION

In a dispatch center, for example a command center and/or an emergency dispatch center, an operator can have many browsers and/or windows open on one or more displays, the browsers and/or windows for communicating with many first responders (e.g. communication devices of responders, such as police service responders, fire service responders, emergency medical service responders, and the like). Indeed, the operator can be communicating with multiple chatgroups and/or multiple first responders in multiple windows on multiple displays. Furthermore, actions that dispatchers need to initiate with first responders generally occur on a per responder basis and/or a per talkgroup basis; when a common action is to occur for multiple responders, the action is initiated in each browser and/or window which leads to an inefficient use of processing resources, inefficient use of the dispatcher and/or dispatcher resources, and which can also lead to an inefficient use of bandwidth.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 11 depicts associated interfaces with an example common actuatable option which, when actuated, initiate the actions of selectable options of the associated interfaces in accordance with some embodiments.

Figure 1:
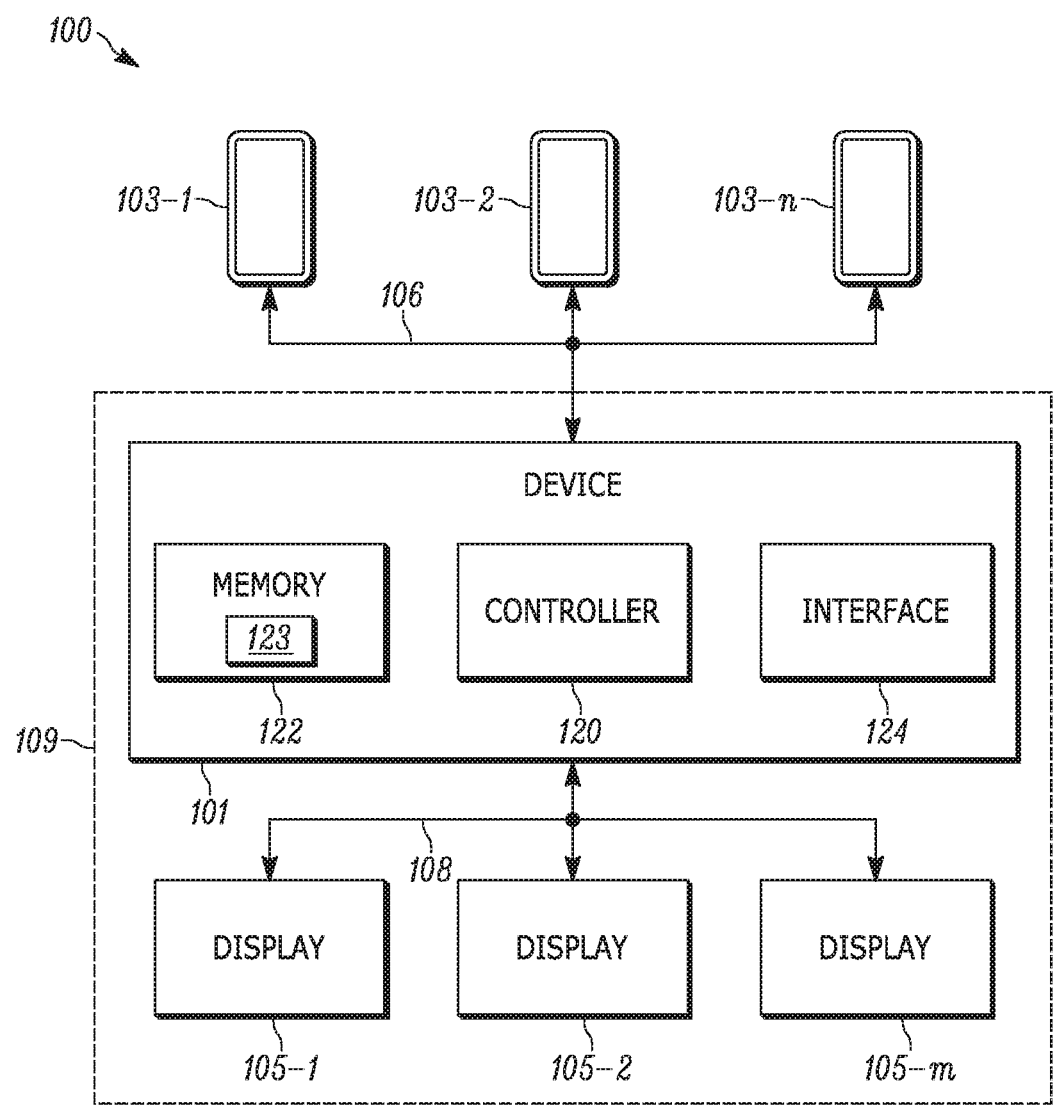
FIG. 1 is a block diagram of an example system for generating common actuatable options that initiate a plurality of actions in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: a communication interface; and a controller configured for communication with one or more display devices, using the communication interface, the controller further configured to: identify, at the one or more display devices, a first interface comprising a first actuatable option which, when actuated, initiates a first action, the first actuatable option having a first label; identify, at the one or more display devices, a second interface comprising a second actuatable option which, when actuated, initiates a second action, the second actuatable option having a second label; determine that the first actuatable option and the second actuatable option are associated using one or more of: the first label and the second label; and the first action and the second action; and, in response, generate, at the one or more display devices, a common actuatable option which, when actuated, initiates both the first action and the second action.

Another aspect of the specification provides a method comprising: at a device comprising: a communication interface; and a controller configured for communication with one or more display devices, using the communication interface, identifying, using the controller, at the one or more display devices, a first interface comprising a first actuatable option which, when actuated, initiates a first action, the first actuatable option having a first label; identifying, using the controller, at the one or more display devices, a second interface comprising a second actuatable option which, when actuated, initiates a second action, the second actuatable option having a second label; determining, using the controller, that the first actuatable option and the second actuatable option are associated using one or more of: the first label and the second label; and the first action and the second action; and, in response, generating, using the controller at the one or more display devices, a common actuatable option which, when actuated, initiates both the first action and the second action.

Yet a further aspect of the specification provides a communication device comprising: one or more display devices; a controller in communication with the one or more display devices; a first interface comprising a first actuatable option which, when actuated, initiates a first action, the first actuatable option having a first label; and a second interface comprising a second actuatable option which, when actuated, initiates a second action, the second actuatable option having a second label, wherein the controller dynamically generates a common actuatable option on the one or more display devices based on an association between one or more of: the first label and the second label; and the first action and the second action, and wherein the common actuatable option, when actuated, initiates both the first action and the second action.

FIG. 1 is a block diagram of a system 100 that includes a device 101 in communication with one or more communication devices 103-1, 103-2 . . . 103-*n* and one or more display devices 105-1, 105-2 . . . 105-*m* using, for example, respective communication links 106 to each of the one or more communication devices 103-1, 103-2 . . . 103-*n* and respective communication links 108 to the one or more display devices 105-1, 105-2 . . . 105-*m*. The one or more communication devices 103-1, 103-2 . . . 103-*n* will be interchangeably referred to hereafter, collectively, as devices 103, and generically as a device 103. Similarly, the one or more display devices 105-1, 105-2 . . . 105-*m* will be interchangeably referred to hereafter, collectively, as the display devices 105, and generically as a display device 105.

In specific embodiments, the system 100 comprises components of a dispatch center and/or a command center, including, but not limited to, an emergency dispatch center used to communicate with first responders and/or emergency responders, and the device 101 comprises a server device and/or a communication device which causes interfaces (including, but not limited to, browsers and/or windows) to be generated at the one or more display devices 105 which are used to communicate with the devices 103. As such, each of the one or more display devices 105 may be components of one or more operator terminals (not depicted) used by one or more operators (not depicted) which interact with the interfaces at the display devices 105 using one or more input devices including, but not limited to, one or more touch screen devices (e.g. incorporated into the one or more of the display devices 105), one or more pointing devices, one or more keyboards, and the like. Such interactions with the interfaces cause actions to be performed which can include, but are not limited to, communications and/or emergency communications between the device 101 and the one or more devices 103, copying and pasting text, for example in text fields at the interfaces etc.

Hence, a number "n" of the devices 103 can include as few as one device 103, but can include tens, hundreds and even thousands of devices 103 depending, for example, on a number of first responders and/or emergency responders being managed within the system 100. Furthermore, the devices 103 and/or channels associated with the devices 103 can be organized into talkgroups and each of the interfaces provided at the one or more display devices 105 communicate with one device 103 and/or one talkgroup (which can include a plurality of the devices 103).

In some embodiments, one or more of the devices 103 generally comprises a mobile device which includes, but is not limited to, any suitable combination of electronic devices, communication devices, computing devices, portable electronic devices, mobile computing devices, portable computing devices, tablet computing devices, telephones, PDAs (personal digital assistants), cellphones, smartphones, e-readers, mobile camera devices and the like. However, other suitable devices are within the scope of present embodiments including non-mobile radios and non-mobile communication devices.

Furthermore, one or more of the devices 103 may be incorporated into vehicles, and the like (for example emergency service vehicles), as a radio, an emergency radio, and the like.

Indeed, in some embodiments, one or more of the devices 103 are specifically adapted for emergency service radio functionality, and the like, used by emergency responders and/or emergency responders, including, but not limited to, police service responders, fire service responders, emergency medical service responders, and the like. In some of these embodiments, the devices 103 further includes other types of hardware for emergency service radio functionality, including, but not limited to, push-to-talk ("PTT") functionality.

A number "m" of the display devices 105 can include as few as one display device 105, but can include tens, hundreds and even thousands of display devices 105 depending, for example, on a size of the dispatch center and/or on a number of operators for which the system 100 is configured. Furthermore, one operator can be interacting with one display device 105 or a plurality of display devices 105. In the latter embodiment, the displays 105 being used by a single operator are grouped together and/or logically grouped together (for example, by the device 101) such that a common actuatable option can be generated for multiple interfaces provided at the plurality of display devices 105, as described in more detail below.

Each of the one or more display devices 105 comprises one or more of a cathode ray tube, a flat panel display, a liquid crystal display, an organic light emitting display, and the like. In some embodiments, one or more of the display devices 105 include a touch screen device and the like. Regardless, each of the one or more display devices 105 can be component of an operator terminal which includes one or more input devices including, but not limited to, one or more touch, one or more pointing devices, one or more keyboards, and the like.

In some embodiments, the device 101 and the one or more display devices 105 may be combined into a single device 109, for example a single communication device including, but not limited to, a personal computer, a laptop computer, a tablet, a handheld device, and the like.

Attention is next directed to the device 101 which comprises: a controller 120, a memory 122, storing an application 123, and a communication interface 124, interchangeably referred to hereafter as the interface 124. The controller 120 is generally configured for communication with the one or more display devices 105, using the communication interface 124. The controller 120 configured to: identify, at the one or more display devices 105, a first interface comprising a first actuatable option which, when actuated, initiates a first action, the first actuatable option having a first label; identify, at the one or more display devices 105, a second interface comprising a second actuatable option which, when actuated, initiates a second action, the second actuatable option having a second label; determine that the first actuatable option and the second actuatable option are associated using one or more of: the first label and the second label; and the first action and the second action; and, in response, generate, at the one or more display devices 105, a common actuatable option which, when actuated, initiates both the first action and the second action.

The controller 120 includes one or more logic circuits, one or more processors, one or more microprocessors, one or more ASIC (application-specific integrated circuits) and one or more FPGA (field-programmable gate arrays). In some embodiments, the controller 120 and/or the device 101 is not a generic controller and/or a generic device, but a device specifically configured to implement common actuatable options for initiating a plurality of actions associated with different interfaces. For example, in some embodiments, the device 101 and/or the controller 120 specifically comprises a computer executable engine configured to implement specific functionality for common actuatable options used to initiating a plurality of actions associated with different interfaces.

The memory 122 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). In the embodiment of FIG. 1, programming instructions (e.g., machine readable instructions) that implement the functional teachings of the device 101 as described herein are maintained, persistently, at the memory 122 and used by the controller 120 which makes appropriate utilization of volatile storage during the execution of such programming instructions.

In particular, the memory 122 of FIG. 1 stores instructions corresponding to the application 123 that, when executed by the controller 120, enables the controller 120 to implement common actuatable option functionality associated with the application 123. In the illustrated example, when the controller 120 executes the application 123, the controller 120 is enabled to: identify, at the one or more display devices 105, a first interface comprising a first actuatable option which, when actuated, initiates a first action, the first actuatable option having a first label; identify, at the one or more display devices 105, a second interface comprising a second actuatable option which, when actuated, initiates a second action, the second actuatable option having a second label; determine that the first actuatable option and the second actuatable option are associated using one or more of: the first label and the second label; and the first action and the second action; and, in response, generate, at the one or more display devices 105, a common actuatable option which, when actuated, initiates both the first action and the second action.

The interface 124 is generally configured to communicate with the one or more display devices 105 using wired and/or wired links 108 as desired, including, but not limited to, cables, WiFi links and the like. In other words, the links 106 can include any suitable combination of wired networks and/or wireless networks.

In some embodiments, the interface 124 is further configured to communicate with the one or more device 103, for example, using one or more communication channels over the links 106. In these embodiments, the interface is implemented by, for example, one or more radios and/or connectors and/or network adaptors, configured to communicate wirelessly, with network architecture that is used to implement one or more communication channels between the device 101 and the display devices 105 and/or a wireless network. In these embodiments, the interface 124 can include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 902.16 standard, and/or other similar type of wireless transceiver configurable to communicate via a wireless network for infrastructure communications.

In yet further embodiments, the interface 124 includes one or more local area network or personal area network transceivers operating in accordance with an IEEE 902.11 standard (e.g., 902.11a, 902.11b, 902.11g), or a Bluetooth transceiver which can be used to communicate with the devices 103 and/or the display devices 105. In some embodiments, the interface 124 is further configured to communicate "radio-to-radio" on some communication channels (e.g. in embodiments where the interface 124 includes a radio), while other communication channels are configured to use wireless network infrastructure.

Example communication channels over which the interface 124 may be generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination.

However, in other embodiments, the interface 124 communicates with the one or more devices 103 using other servers and/or communication devices, for example by communicating with the other servers and/or communication devices using, for example, packet-based and/or internet protocol communications, and the like, and the other servers and/or communication devices use radio communications to wirelessly communicate with the one or more devices 103.

Indeed, communication between the device 101, the one or more devices 103 and the one or more display device 105 can further include any suitable combination of wired networks and/or wireless networks. In other words, the links 108 can include any suitable combination of wired networks and/or wireless networks.

In any event, it should be understood that a wide variety of configurations for the system 100 and/or the device 101 are within the scope of present embodiments.

Figure 2:
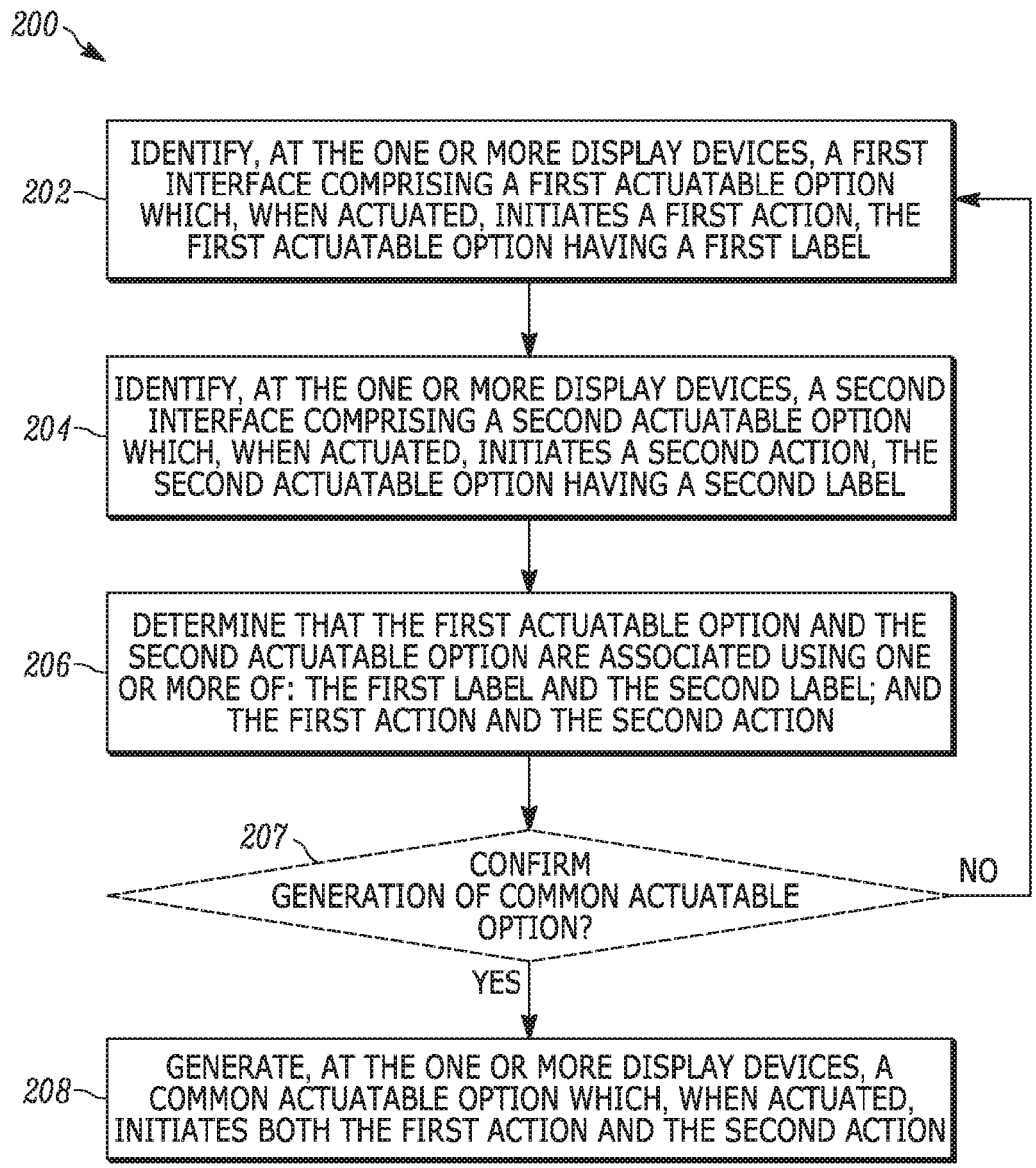
FIG. 2 is a flowchart of an example method generating common actuatable options that initiate a plurality of actions in accordance with some embodiments.

Attention is now directed to FIG. 2 which depicts a flowchart representative of a method 200 for implementing common actuatable options for initiating a plurality of actions associated with different interfaces. In some embodiments, the operations of the method 200 of FIG. 2 correspond to machine readable instructions that are executed by, for example, the device 101 of FIG. 1, and specifically by the controller 120 of the device 101. In the illustrated example, the instructions represented by the blocks of FIG. 2 are stored at the memory 122, for example, as the application 123. The method 200 of FIG. 1 is one way in which the system 100 and/or the device 101 and/or the controller 120 is configured. Furthermore, the following discussion of the method 200 of FIG. 2 will lead to a further understanding of the device 101, and its various components.

However, it is to be understood that the system 100 and/or the device 101 and/or the controller 120 and/or the method 200 may be varied, and need not work exactly as discussed herein in conjunction with each other, and that such variations are within the scope of present embodiments.

Furthermore, the method 200 of FIG. 2 need not be performed in the exact sequence as shown and likewise various blocks may be performed in parallel rather than in sequence. Accordingly, the elements of method 200 are referred to herein as "blocks" rather than "steps".

At the block 202, the controller 120 identifies, at the one or more display devices 105, a first interface comprising a first actuatable option which, when actuated, initiates a first action, the first actuatable option having a first label At the block 204, the controller 120 identifies, at the one or more display devices 105, a second interface comprising a second actuatable option which, when actuated, initiates a second action, the second actuatable option having a second label.

At the block 206, the controller 120 determines that the first actuatable option and the second actuatable option are associated using one or more of: the first label and the second label; and the first action and the second action.

At an optional block 207, the controller 120 confirms whether a common actuatable option is to be generated, for example by generating a request, at the one or more display devices 105, to confirm generation of the common actuatable option. The block 207 being optional is indicated by block 207 being depicted in broken lines. When the optional request generates a negative response (e.g. a "NO" decision at the block 207), the method 200 repeats from the block 202. When the request generates a positive response (e.g. a "YES" decision at the block 207), the controller 120 implements the block 208.

At the block 208, the controller 120, in response to determining that the first actuatable option and the second actuatable option are associated (and optionally in response to a positive response being received at the block 207), generates, at the one or more display devices 105, a common actuatable option which, when actuated, initiates both the first action and the second action.

Example embodiments of the method 200 is next described with reference to FIG. 3 to FIG. 11. Furthermore, each of FIGS. 3, 4, 5, 7, 8, 9, 10 and 11 depict example interfaces provided and/or rendered and/or displayed at an example display device 305, which can include, but is not limited to one of the display devices 105, or a plurality of the display devices 105 which are grouped and/or logically grouped as described above.

Figure 3:
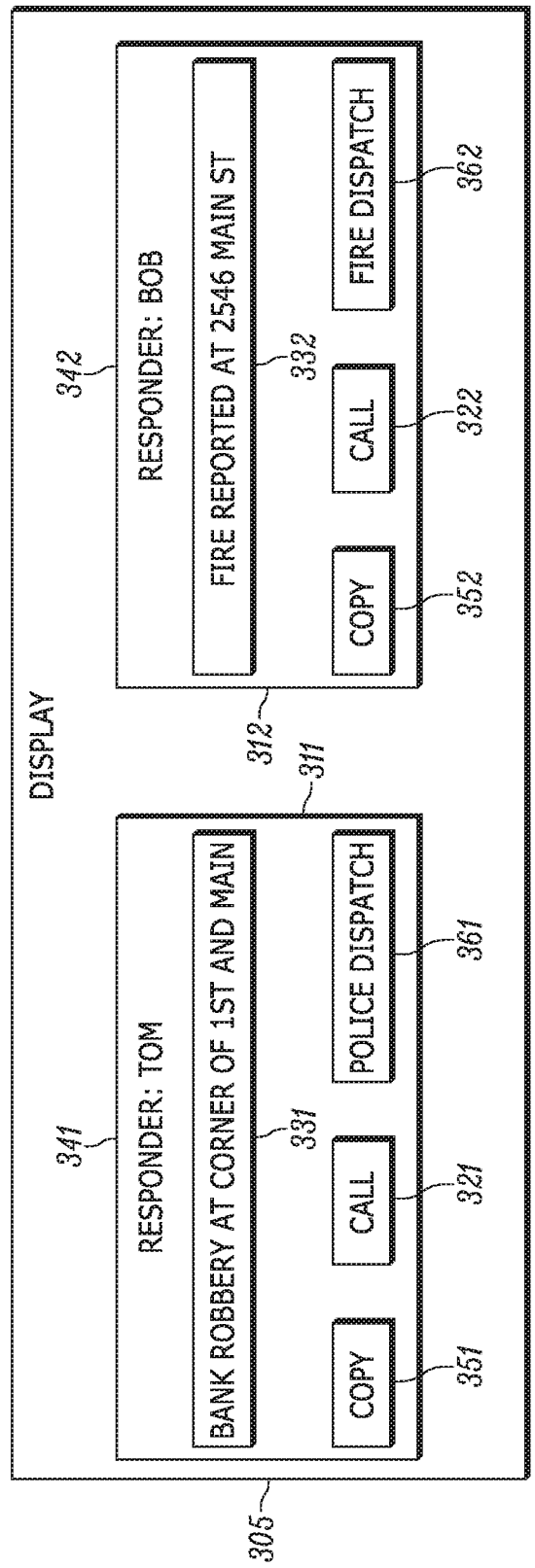
FIG. 3 depicts example associated interfaces generated at a display device, the interfaces having selectable options that initiate actions when actuated in accordance with some embodiments.

Attention is next directed to FIG. 3 which depicts a first interface 311 and a second interface 312 being provided at the display device 305. The first interface 311 comprises a first actuatable option 321 which, when actuated, initiates a first action, the first actuatable option 321 having a first label (e.g. "CALL"). Similarly, the second interface 312 comprises a second actuatable option 322 which, when actuated, initiates a second action, the second actuatable option 322 having a second label (e.g. "CALL"). Each of the actuatable options 321, 322 comprise a virtual button, and the like, rendered at the display device 305 which, when actuated, implements a respective action. While the actuatable options 321, 322 are depicted as respective virtual buttons, other types of actuatable options are within the scope of present embodiments, including, but not limited to, radio buttons, checkboxes, and the like.

Each of the interfaces 311, 312 has been generated by the device 101, for example in response to receiving a notification of a respective event to which first responders can be dispatched, for example as received from an emergency call center, such as a 911 call center; indeed, in some embodiments, the device 101 can also comprise a communication device and/or server which manages emergency calls, for example from members of the public reporting events. Indeed, any process and/or technique for receiving event notifications, and generating interfaces in response thereto, is within the scope of the present specification including, but not limited, receiving data from an information service to which the device 101 is subscribed.

As such, each of the interfaces 311, 312 include a respective field 331, 332 which provide an indication of an event with which the interfaces 311, 312 are associated. For example, the field 331 of the interface 311 includes text "Bank robbery at corner of 1st and Main", indicating an event suitable for response by a police service responder, and the field 332 of the interface 312 includes text "Fire reported at 2546 Main St", indicating an event suitable for response by a fire service responder.

Furthermore, each of the interfaces 311, 312 include a respective field 341, 342 indicating a suggested emergency responder and/or first responder (e.g. "TOM" for interface 311, and "BOB" for interface 312) to whom the event may be assigned, as assigned by the device 101. Indeed, while not depicted, the memory 122 may store a database, and the like, of first responders to whom events may be automatically assigned, based, for example, on one or more of: a classification of an event (e.g. a criminal and/or police-related event, a fire-related event, a medical-related event, a weather-related event, and the like), an assigned role of the first responders (e.g. police officer and/or a police service responder, a fire fighter and/or a fire service responder, emergency medical service responders, a weather-related first responder, and the like), a geographic location and/or rank of the first responder, and the like. Indeed, any process and/or technique for assigning a responder to an event is within the scope of the present specification.

Hence, the action associated with the actuatable option 321 comprises initiating a communication to a first device 103 associated with the responder "TOM" (e.g. a police service responder), for example using the interface 124, and which can occur over a first channel. Similarly, the action associated with the actuatable option 322 comprises initiating a communication to a second device 103 associated with the responder "BOB" (e.g. a fire service responder), for example using the interface 124, and which can occur over a second channel. In other words, each of the actuatable options 321, 322 are associated with a respective set of instructions which cause the device 101 to initiate communications with a respective device 103, which can occur over different respective channels. Use of two channels to communicate with the respective device 103 may be an inefficient use of bandwidth when the events with which the interfaces 311, 312 are associated are related.

Each of the interfaces 311, 312 further comprise a respective actuatable option 351, 352 having a respective label "COPY" which, when actuated, causes the respective text in the fields 331, 332 to be copied, for example for a copy-and-paste action. In some embodiments, one or more of interfaces 311, 312 may not have text in the fields 331, 332; in these embodiments, such interfaces are not provided with a "COPY" actuatable option.

Furthermore, the interface 311 comprise a respective actuatable option 361, having a label "Police Dispatch", which, when actuated, causes a communication to a police services dispatch center to be initiated, for example using the interface 124. Similarly, the interface 312 comprise a respective actuatable option 362, having a label "Fire Dispatch", which, when actuated, causes a communication a fire services dispatch center to be initiated, for example using the interface 124. Each of the actuatable options 361, 362 are generated based on a type of a respective event and, for example, corresponding data stored at the memory 122. Indeed, the interfaces 311, 312 can be populated with any number of actuatable interfaces which can, in some embodiments, depend on the type of event with which an interface is associated. Indeed, the memory 122 may store interface templates associated with different event types, and interfaces 311, 312 may be generated from the interface templates populated with appropriate respective data based on the event type, and the like.

At the blocks 202, 204 of the method 200, the controller 120 identifies each of the interfaces 311, 312 and, at the block 206, the controller 120 determines that that the first actuatable option 321 and the second actuatable option 322 are associated using one or more of: the first label and the second label; and the first action and the second action.

In particular, the controller 120 may identify the interfaces 311, 312 by maintaining a list of active interfaces, for example at the memory 122, and comparing the active interfaces with criteria stored in the memory 122 (e.g. in the application 123) to determine which active interfaces include actuatable options which, when actuated, initiates an action, and having a label. In some embodiments, such active interfaces may be rendered and/or provided and/or displayed at the display device 305 (e.g. as depicted); however, in other embodiments, such active interfaces may be running in the background (e.g. not rendered and/or provided and/or displayed at the display device 305).

Furthermore, the identification of interfaces at the blocks 202, 204 may occur only when two or more active interfaces are at the device 101 and/or on the list of active interfaces. In other words, the method 200 is implemented when at least a second interface becomes active, but not when only one interface is active.

Furthermore, the method 200 may be implemented each time an interface becomes active.

Once the interfaces 311, 312 are identified, the controller 120 can determine that the first actuatable option 321 and the second actuatable option 322 are associated by comparing the first label and the second label; as each of the first label and the second label are similar and/or having matching text, the controller can determine that the first actuatable option 321 and the second actuatable option 322 are associated. Similarly, the controller 120 can determine that the first actuatable option 321 and the second actuatable option 322 are associated by comparing the first action and the second action respectively associated with the actuatable options 321, 322. For example, each of the actions associated with the actuatable options 321, 322 comprise initiating a communication with respective devices 103.

The controller 120 may further, in some embodiments, determine that the first actuatable option 321 and the second actuatable option 322 are associated by comparing further information and/or metadata associated with each of the interfaces 311, 312 including, but not limited to, geographic information. For example, the interface 311 is associated with an event occurring at a geographic location "corner of 1$^{st}$ and Main", while the interface 312 is associated with an event occurring at a geographic location "2546 Main St). The controller 120 may, in some embodiments, compare these two geographic locations and when they are within a given distance (e.g. as stored in the application 123 and/or the memory 122), the controller 120 can determine that the two events are associated, and hence that the interfaces 311, 312 are associated. Indeed, any available information and/or metadata associated with each of the interfaces 311, 312 can be used to determine an association between the interfaces 311, 312.

Furthermore, one or more weighting schemes may be applied to determine an association between the interfaces 311, 312; for example, the text of the fields 331, 332 may be compared by the controller 120, with different phrases and/or different words being weighted in such a comparison.

For example, the geographic locations associated with each of the text of the fields 331, 332 may be assigned a higher weight than a comparison of the event types defined by the words "Bank robbery" and "Fire". Indeed, any weighting scheme, and/or weighting technique for determining associations between the interfaces 311, 312 is within the scope of present embodiments.

Similarly, a weighting scheme may be applied to determine an association between the actuatable options 321, 322. For example, if the labels on the actuatable options 321, 322 did not match (e.g. if one label were "CALL" and the other were "Initiate Communication", but the associated, actions were similar (e.g. similar instructions to initiate communications to respective devices 105), the comparison between the respective labels may be assigned a lower weight than a comparison between the respective actions.

Indeed, the block 206 may optionally include one or more of: determining an association between the actuatable options 321, 322 based on an association between the interfaces 311, 312; determining an association between the actuatable options 321, 322 based on an association between the interfaces 311, 312 using one or more weighting schemes; determining an association between the actuatable options 321, 322 using one or more weighting schemes; and the like.

Figure 4:
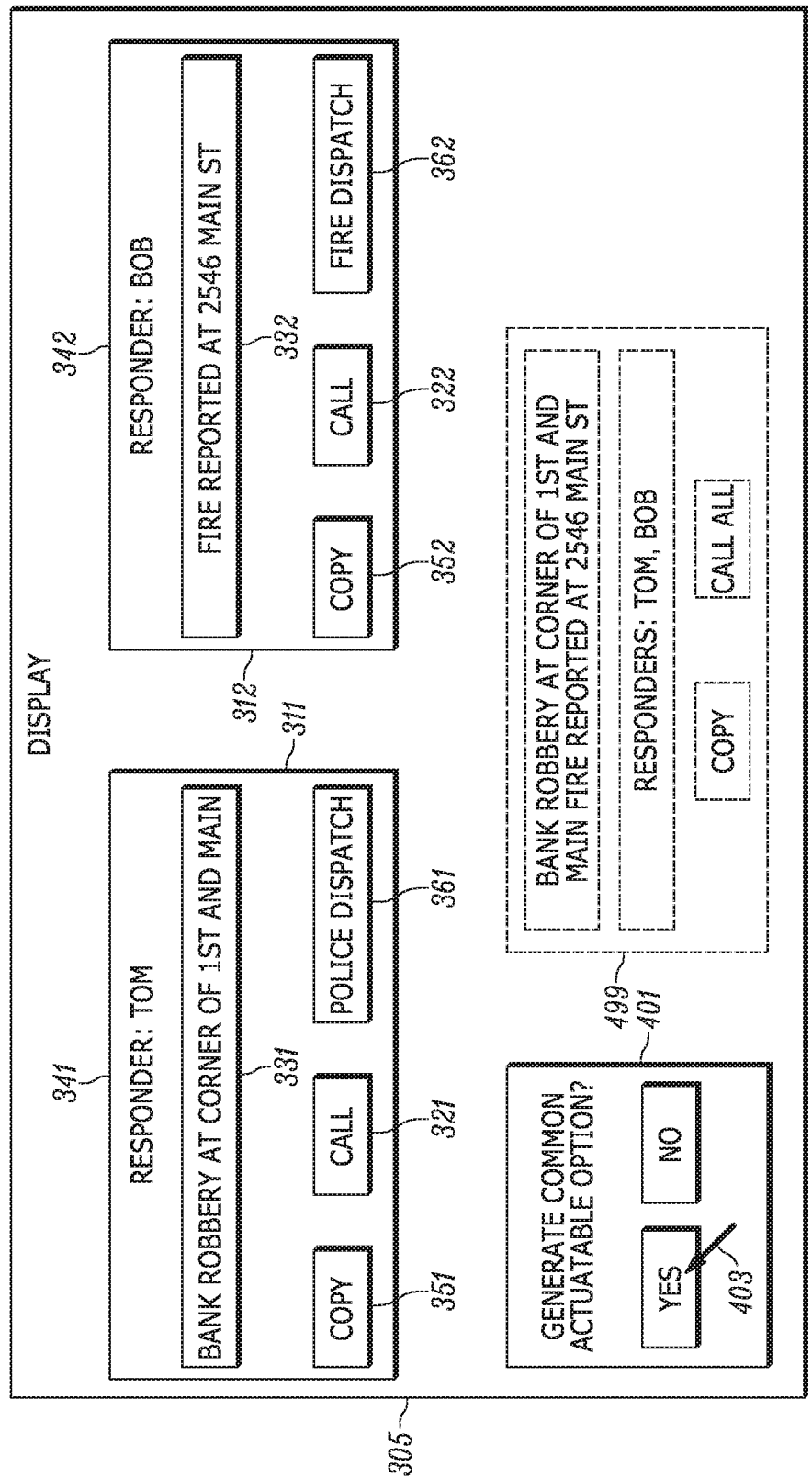
FIG. 4 depicts the interfaces of FIG. 3 with a request to confirm generation of a common actuatable option in accordance with some embodiments.

Attention is next directed to FIG. 4, which is substantially similar to FIG. 3 with like elements having like numbers. In FIG. 4, however, it is assumed that blocks 202, 204 and 206 of the method 200 have occurred, and that the controller 120 is implementing the optional block 207. In particular, in FIG. 4, the controller 120, in response to determining that the first actuatable option 321 and the second actuatable option 322 are associated, generates a request 401 to confirm generation of the common actuatable option. In particular, the request 401 comprises two actuatable options labelled "YES" and "NO"; when the option "NO" is selected, a "NO" decision occurs at the block 207. However, when the option "YES" is selected, a "YES" decision occurs at the block 207. For example, as depicted, the option "YES" is being selected using a pointer 403 controlled using an input device, such as a touch screen of the display device 305 (and/or a pointing device, and the like). As depicted, FIG. 4 further shows an optional preview 499 of the common actuatable option, the preview 499 showing the appearance of the common actuatable option that will be provided when the option "YES" is selected. The preview 499, when present, may be shaded (as indicated by the preview 499 being depicted in broken lines), and the like, to indicate that options at the preview 499 are not available for selection and/or to receive input. In other embodiments, however, the preview 499 is not provided. Furthermore, whether the preview 499 is provided or not may be configurable at one or more of the device 101, the device 109 and the controller 120, and/or using the application 123.

Figure 5:
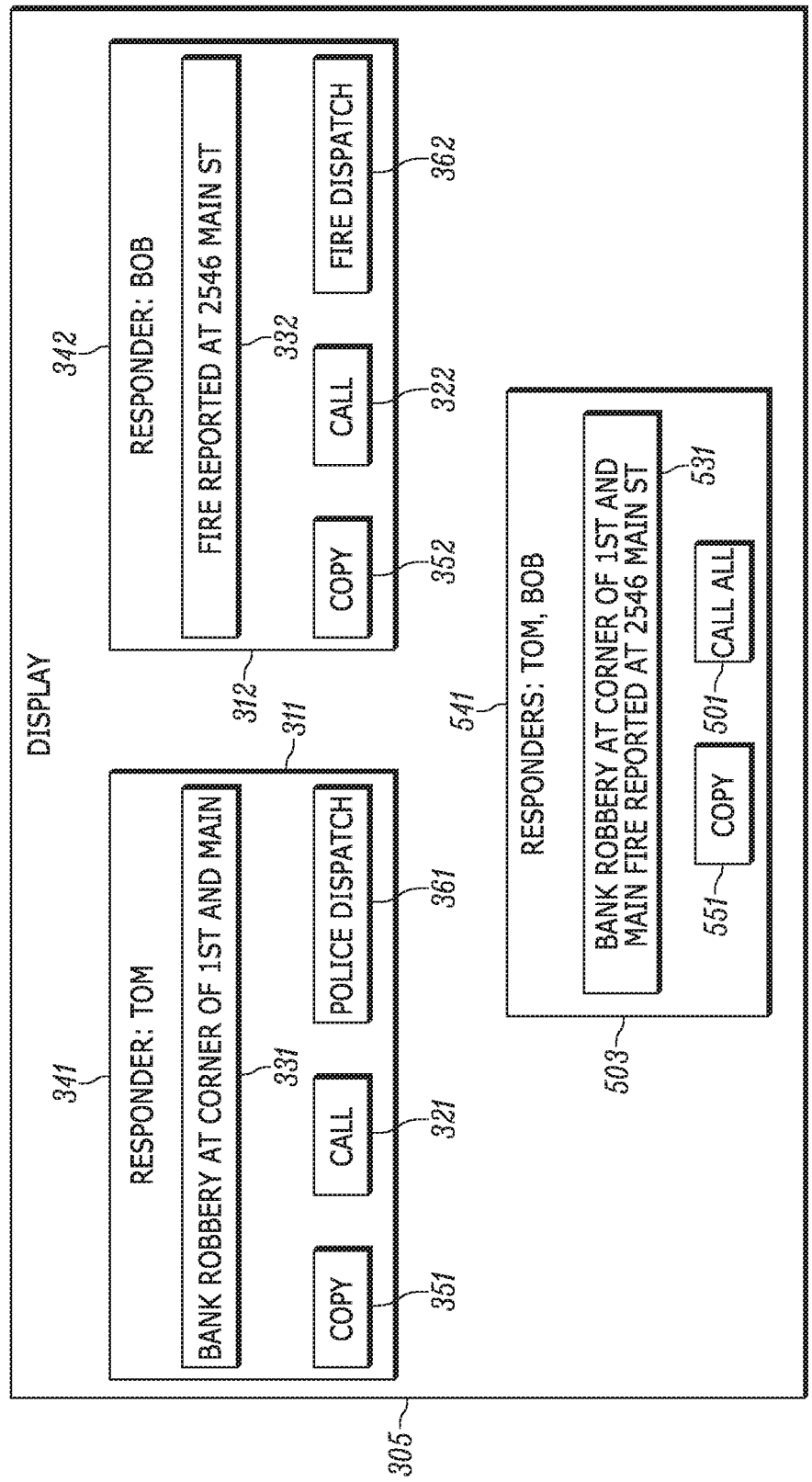
FIG. 5 depicts the associated interfaces of FIG. 3 with an example common actuatable option which, when actuated, initiate the actions of the selectable options of the associated interfaces in accordance with some embodiments.

Attention is next directed to FIG. 5, which is substantially similar to FIG. 3 with like elements having like numbers. In FIG. 5 however, it is assumed that blocks 202, 204, and 206 (and optionally block 207) of the method 200 have occurred, and that the controller 120 is implementing the block 208. In particular, in FIG. 5, the controller 120, in response to determining that the first actuatable option 321 and the second actuatable option 322 are associated (and optionally in response to receiving a positive response to the request 401, the positive response indicative that generation of the common actuatable option is to proceed), generates, at the one or more display devices 105, a common actuatable option 501 which, when actuated, initiates both the first action and the second action respectively associated with the first actuatable option 321 and the second actuatable option 322. In particular, actuation of the common actuatable option 501 will initiate a call to each of the devices 103 associated with the responders "TOM" and "BOB". Furthermore, the common actuatable option 501 has a same and/or similar format to the optional preview 499 (when generated) and may optionally be generated at a same and/or similar position as the optional preview 499.

As depicted, the common actuatable option 501 is generated at a third interface 503. Put another way, the controller 120 is further configured to generate at the one or more display devices 305, the common actuatable option 501 in a third interface 503.

Indeed, as the first interface 311 and the second interface 312 have substantially similar respective configurations (e.g. their respective layouts are similar), in the depicted embodiment, the controller 120 is further configured to generate at the one or more display devices 305, the common actuatable option 501 in the third interface 503, the third interface 503 having a configuration substantially similar to the respective configurations of the first interface 311 and the second interface 312. Put another way, as depicted, the first interface 311 and the second interface 312 may be generated from a common interface template stored in the memory 122 (e.g. at the application 123), and the third interface 503 may be generated from the same common template.

For example, the third interface 503 also comprises a field 531 which provides an indication of the events with which the third interface 503 are associated, for example, by copying, and concatenating, the text from the fields 331, 332. The third interface 503 also comprises a field 541 which provides an indication of suggested emergency responders and/or first responders to whom the events may be assigned by copying, and concatenating, the text from the fields 341, 342.

Furthermore, the third interface 503 comprises an actuatable option 551 for copying the text from the field 531, similar to the actuatable options 351, 352. Indeed, as depicted, the method 200 can be used to determine that the actuatable options 351, 352 are associated using the blocks 202, 204, and 206, and the actuatable option 551 can be generated at the block 208. In other words, the method 200 may be applied to more than one actuatable option at the interfaces 311, 312.

In any event, the third interface 503 does not include an actuatable option which corresponds to the actuatable options 361, 362 as it is assumed that, at the block 206, no association was found between the actuatable options 361, 362, for example as they were associated with calling dispatches of different emergency responder services. However, in other embodiments, the third interface 503 can include a common actuatable option for calling both of the dispatches of the different emergency responder services based on, for example, a weighting scheme that assigns a higher weight to calling dispatches of different emergency responder services, for example, when the events associated with each of the interfaces 311, 312 are within a given geographic distance.

As depicted, the common actuatable option 501 comprises a respective label that is substantially similar to the first label ("CALL") of the first actuatable option 321 and the second label ("CALL") of the second actuatable option 322. For example, the label of the common actuatable option 501 comprises a label "CALL ALL", which indicates that actuation of the common actuatable option 501 will result in the devices 103 associated with both "TOM" and "BOB" being called. In other words, in the depicted embodiments, the label "CALL ALL" of the common actuatable option 501 is generated from the label "CALL" from each of the actuatable options 321, 322 by modifying the label "CALL" to indicate that a combined action will occur when the common actuatable option 501 is generated.

Indeed, actuation of the common actuatable option 501 will cause a similar action to each of the actuatable options 321, 322 being separately actuated, which may reduce use of processing resources at the device 101. This may also reduce use of bandwidth between the device 101 and the devices 103 associated with the responders "TOM" and "BOB", as, for example, the call to the device 103 can occur on a common channel and not separate channels, as may occur when each of the actuatable options 321, 322 are separately actuated.

While present embodiments are described with respect to the actuatable options 321, 322 being a "CALL" action, in other embodiments, the actuatable options 321, 322 can include, but are limited to, a "SEND" action, a "REPLY" action, a "CALL MOBILE" action, a "CALL LANDLINE" action, and the like, with the labels of the actuatable options 321, 322 adapted accordingly, and the common actuatable action 501 adapted accordingly.

Figure 6:
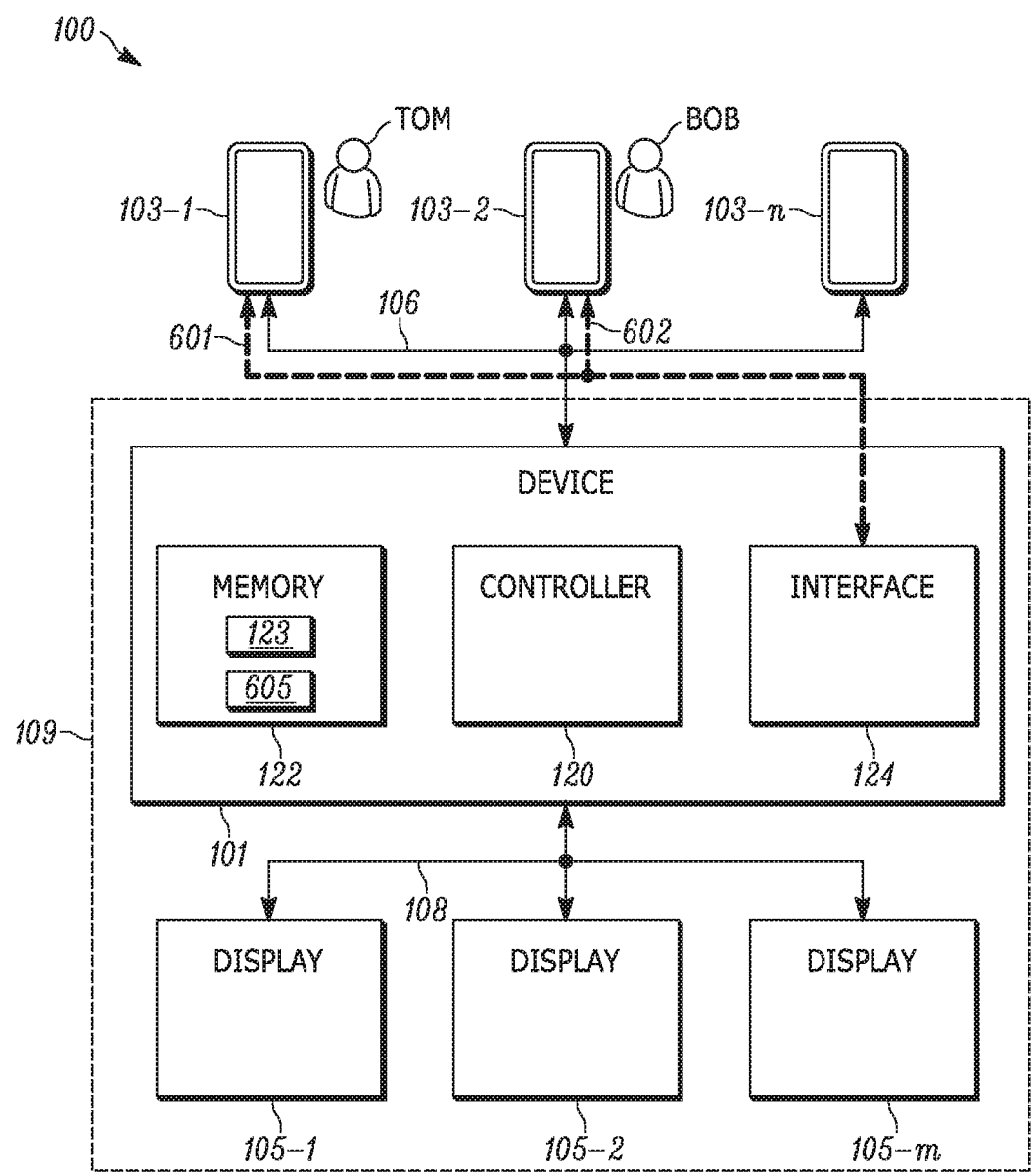
FIG. 6 depicts the system of FIG. 1 showing an example controller initiating the actions of the selectable options of the associated interfaces of FIG. 3, in response to the common actuatable option being actuated, in accordance with some embodiments.

Attention is next directed to FIG. 6, which is substantially similar to FIG. 1, with like elements having like numbers. However, in FIG. 6, it is assumed that: the blocks 202, 204, 206, 207 and 208 of the method 200 have been implemented; the first communication device 103-1 is associated with the responder "TOM"; and the second communication device 103-2 is associated with the responder "BOB". Furthermore, in response to the common actuatable option 501 being actuated, the communication interface 124 is in further communication with at least the first communication device 103-1 and the second communication device 103-2 for example by implementing both the first action associated with the first actuatable option 321 and the second action associated with the second actuatable option 322. Indeed, as depicted the first action comprises initiating a first communication 601 with the first communication device 103-1 and the second action comprises initiating a second communication with the second communication device 103-2.

However, as also depicted in FIG. 6, the first communication device 103-1 and the second communication device 103-2 can occur by forming a talkgroup 605 that includes the first communication device 103-1 and the second communication device 103-2, the talkgroup 605 being stored at the memory 122. Indeed, as depicted, the controller 120 may be further configured to: in response to one or more of determining that the first actuatable option 321 and the second actuatable option 322 are associated, and the common actuatable option 501 being actuated: generate the talkgroup 605 that includes the first communication device 103-1 and the second communication device 103-2; and, when the common actuatable option 501 is actuated, initiate the first communication 601 and the second communication 602 by initiating a communication with the talkgroup 605, for example over a common channel between the devices 101, 103-1, 103-2.

The communications 601, 602, and/or the communication with the talkgroup 605, may comprise one or more of: a general alert message to the devices 103-1, 103-2 (e.g. of the events associated with each of the interfaces 311, 312), a unidirectional message (e.g. to the devices 103-1, 103-2), and the like.

Furthermore, the talkgroup 605 can be generated when the block 206 is implemented or when the block 208 is implemented. In the latter embodiment, the talkgroup 605 is not implemented until the common actuatable option 501 is actuated.

The method 200 can be further adapted for use with more than two interfaces. For example, attention is directed to FIG. 7 which is substantially similar to FIG. 3, with like elements having like numbers. However, in FIG. 7, two further interfaces 711, 712 have been generated at the display device 305, each of the two further interfaces 711, 712 including: respective actuatable options 721, 722 similar to the actuatable options 321, 322; respective fields 731, 732 indicating respective associated events (e.g. the interface 711 being associated with a weather event "Tornado watch expires at 9:30", and the interface 712 being associated with a medical event "Gun shot and burn victims at 2546 Main St"); respective fields 741, 742 indicating assigned responders, the actuatable options 721, 722 for initiating communications to the devices 103 associated with the assigned responders; and the actuatable options 761, 762, each of which comprise actuatable options that are particular to the associated event. For example, the actuatable option 761 comprises an actuatable option for initiating searching for current weather conditions, while the actuatable option 762 comprises an actuatable option for initiating a communication to a hospital dispatch.

In any event, the method 200 may be implemented to determine whether there is an association between any of the actuatable options 321, 322, 351, 352, 361, 362, 721, 722, 751, 752, 761, 762. Indeed, as has already been described, an association may be determined between the actuatable options 321, 322.

Hence, the controller 120 can be further configured to identify, at the one or more display devices 105, the third interface 711 comprising a third actuatable option 721 which, when actuated, initiates a third action, the third actuatable option 721 associated with the first actuatable option 321 and the second actuatable option 322. For example, as depicted, each of the actuatable options 321, 322, 721 comprises initiating a communication to a respective first responder and/or each of the actuatable options 321, 322, 721 comprises a similar label "CALL". However, the third interface 711 may not be associated with the first interface 311 and the second interface 312 as the third interface 711 is associated with a weather event that is unrelated to the police and fire events of the first interface 311 and the second interface 312. Hence, the controller 120 can be adapted to determine whether the third interface 711 is associated with the first interface 311 and the second interface 312, for example using techniques described above, and/or using any suitable weighting scheme. As depicted, the controller 120 may determine that the third interface 711 is not associated with the first interface 311 and the second interface 312.

However, the controller 120 may determine that the fourth interface 712 is associated with the first interface 311 and the second interface 312, as the fourth interface 712 is associated with a medical event that is at a geographic location similar to the geographic location of the events associated with the first interface 311 and the second interface 312. Similarly, the text of the field 732 further indicates that a gunshot victim is at the associated geographic location, which can be determined to be both a medical event and police event, to establish an association with the interface 311. Similarly, the text of the field 732 further indicates that a burn victim is at the associated geographic location, which can be determined to be both a medical event and fire event, to establish an association with the interface 312.

Hence, the controller 120 determines that the third interface 711 is not associated with the first interface 311 and the second interface 312, and the fourth interface 712 is associated with the first interface 311 and the second interface 312.

Figure 7:
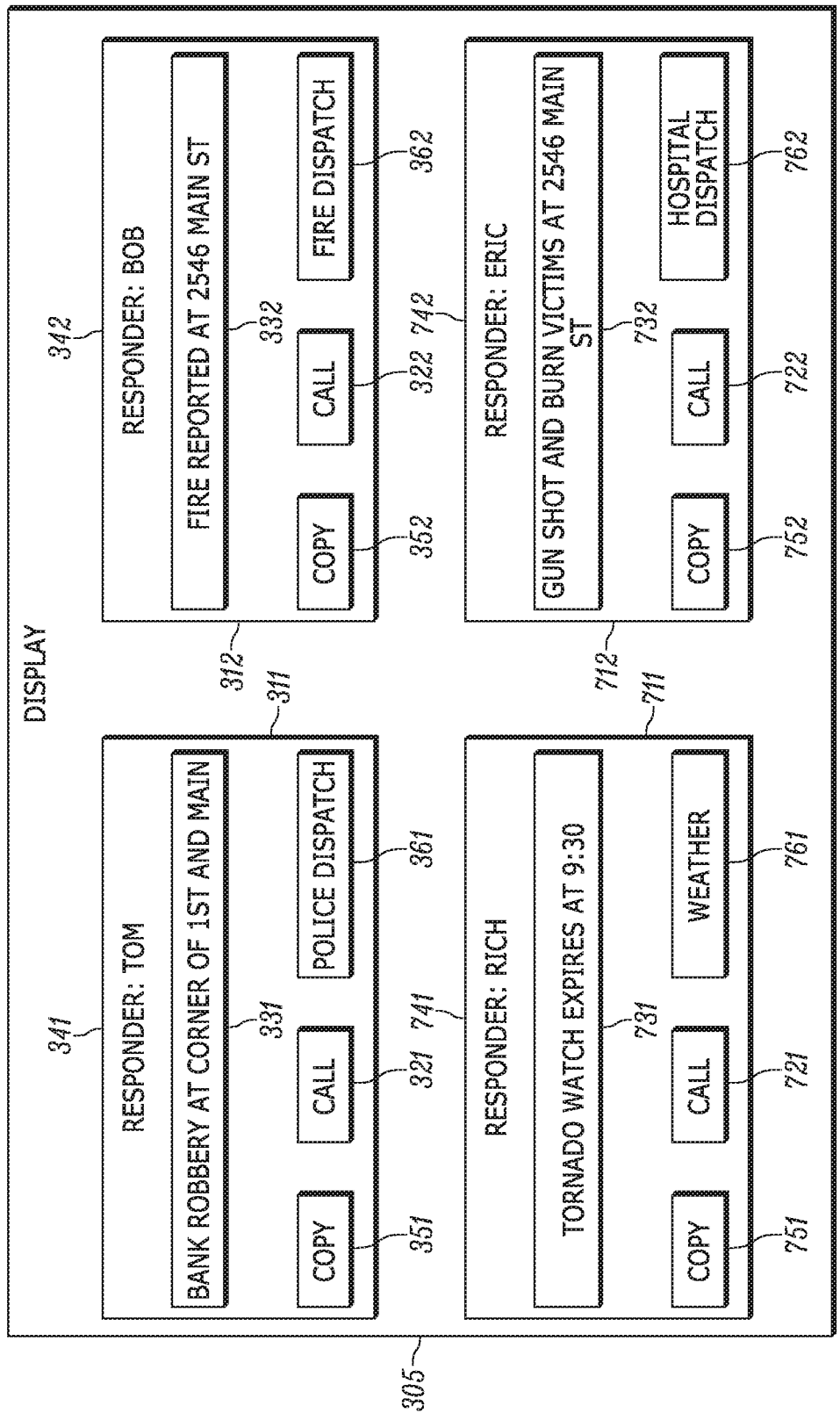
FIG. 7 depicts example interfaces generated at a display device, the interfaces having selectable options that initiate actions when actuated, three of the example interfaces being associated, in accordance with some embodiments.
Figure 8:
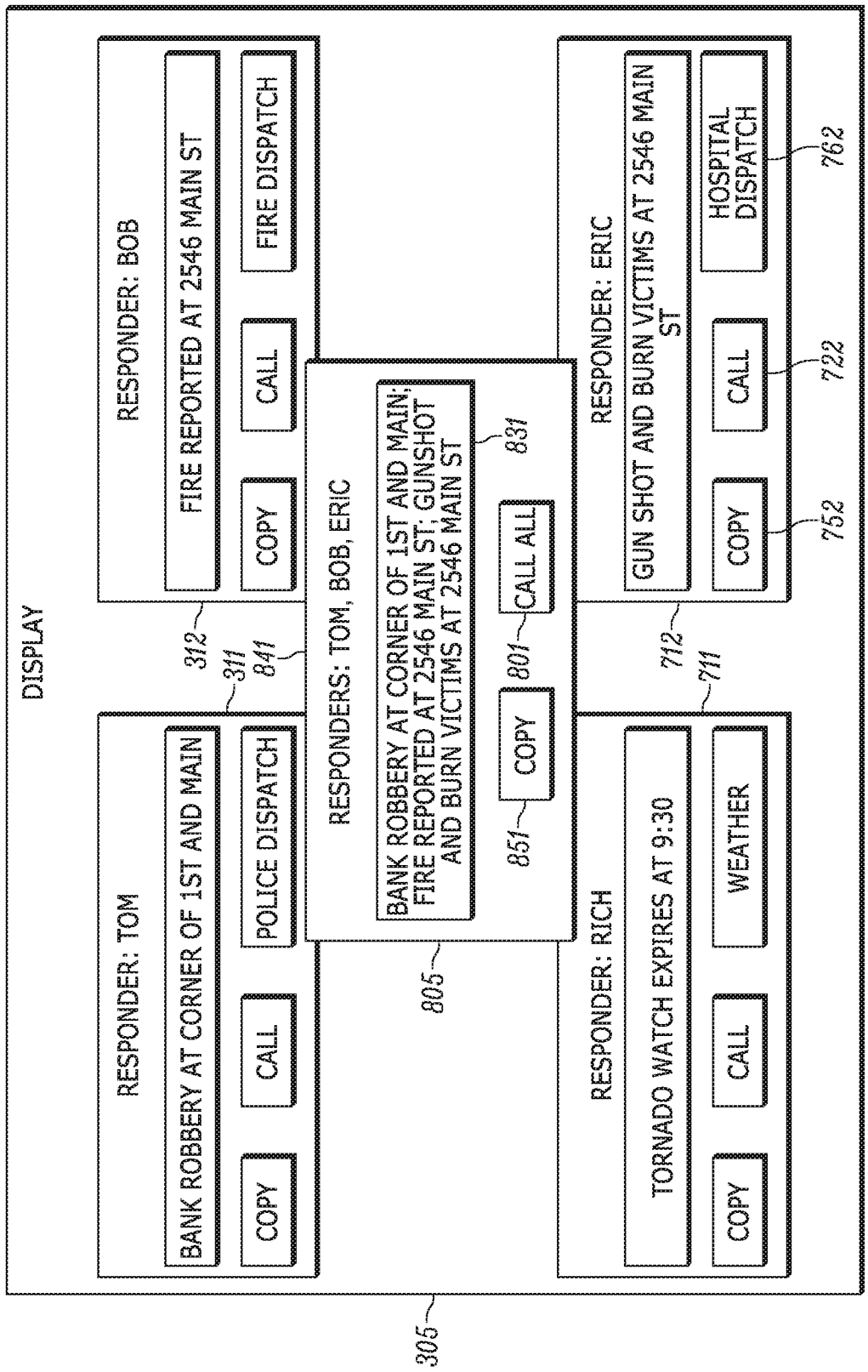
FIG. 8 depicts the interfaces of FIG. 4 with an example common actuatable option which, when actuated, initiate the actions of the selectable options of the associated interfaces in accordance with some embodiments.

Attention is hence next directed to FIG. 8, which is substantially similar to FIG. 7, with like elements having like numbers. It is assumed in FIG. 8 that blocks 202, 204, 206 and 208 (and optionally block 207) of the method 200 have been implemented. However, in FIG. 8, the controller 120 has generated a common actuatable option 801 which, when actuated, initiates all of the first action associated with the first actuatable option 321, the second action associated with the second actuatable option 322, and the action associated with the actuatable option 722. As the third interface 711 is not associated with the first interface 311 and the second interface 312, the common actuatable option 801, when actuated, excludes initiating of the action associated with the actuatable option 721.

As depicted, the common actuatable option 801 is provided in a fifth interface 805 having a format similar to the associated interfaces 311, 312, 712 (e.g. each of the interfaces 311, 312, 712, 805 being generated from a common interface template), and the fifth interface 805 being similar to the interface 503. Hence, fifth interface 805 further comprises: a field 831 in which the text from the fields 331, 332, 732 are concatenated; and a field 841 in which the text from the fields 341, 342, 742 are concatenated. As depicted, the fifth interface 805 is overlaid on the other interfaces 311, 312, 711, 712, however, in other embodiments, the fifth interface 805 is not overlaid on the other interfaces 311, 312, 711, 712.

The fifth interface 805 further comprises an actuatable option 851 for copying the text from the field 831, similar to the actuatable option 551. Indeed, as depicted, the method 200 can be used to determine that the actuatable options 351, 352, 722 are associated using the blocks 202, 204, and 206, and the actuatable option 851 can be generated at the block 208. In other words, the method 200 may be applied to more than one actuatable option at the interfaces 311, 312, 712.

In any event, FIG. 7 and FIG. 8 depict embodiments where the controller 120 is further configured to: identify, at the one or more display devices 105, a third interface (e.g. one or more of interfaces 711, 712) comprising a third actuatable option (e.g. one or more of actuatable options 721, 722) which, when actuated, initiates a third action, the third actuatable option associated with the first actuatable option 321 and the second actuatable option 322; determine whether the third interface is associated with the first interface 311 and the second interface 312; when the third interface is associated with the first interface 311 and the second interface 312, generate, at the one or more display devices 105, the common actuatable option 801 which, when actuated, initiates all of the first action, the second action and the third action; and, when the third interface is not associated with the first interface 311 and the second interface 312, generate, at the one or more display devices 105, the common actuatable option 801 which, when actuated, initiates the first action and the second action, excluding the third action.

Heretofore, common actuatable options have been described as being generated at the block 208 in an interface, such as the interfaces 503, 805. However, common actuatable options may be generated using other formats and/or techniques.

Figure 9:
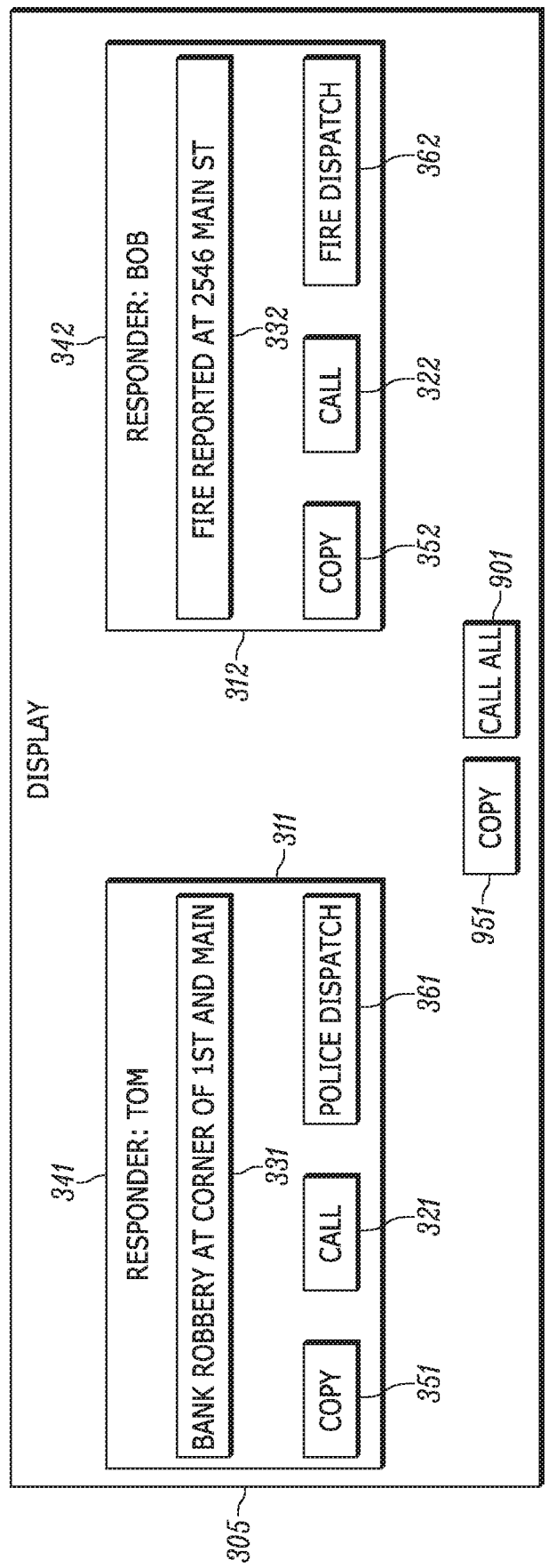
FIG. 9 depicts the associated interfaces of FIG. 3 with example standalone common actuatable options, in accordance with some embodiments.

For example, attention is next directed to FIG. 9 which is substantially similar to FIG. 2, with like elements having like numbers. However, in FIG. 9 it is assumed that the blocks 202, 204, 206, and 208 (and the optional block 207) have been implemented, such that a common actuatable option 901 has been generated which, when actuated, initiates the actions associated with the actuatable options 321, 322. Similarly, in FIG. 9, a common actuatable option 901 has been generated which, when actuated, initiates the actions associated with the actuatable options 351, 352. However, in contrast to the common actuatable options 501, 551, the common actuatable option 901 and the common actuatable option 951 have been generated as standalone actuatable options, for example external to any interfaces at the display device 305. Association of the common actuatable options 901, 951 with the interfaces 311, 312 may be indicated by proximity of the common actuatable options 901, 951 to the interfaces 311, 312, color, shading, lines therebetween, and the like.

Figure 10:
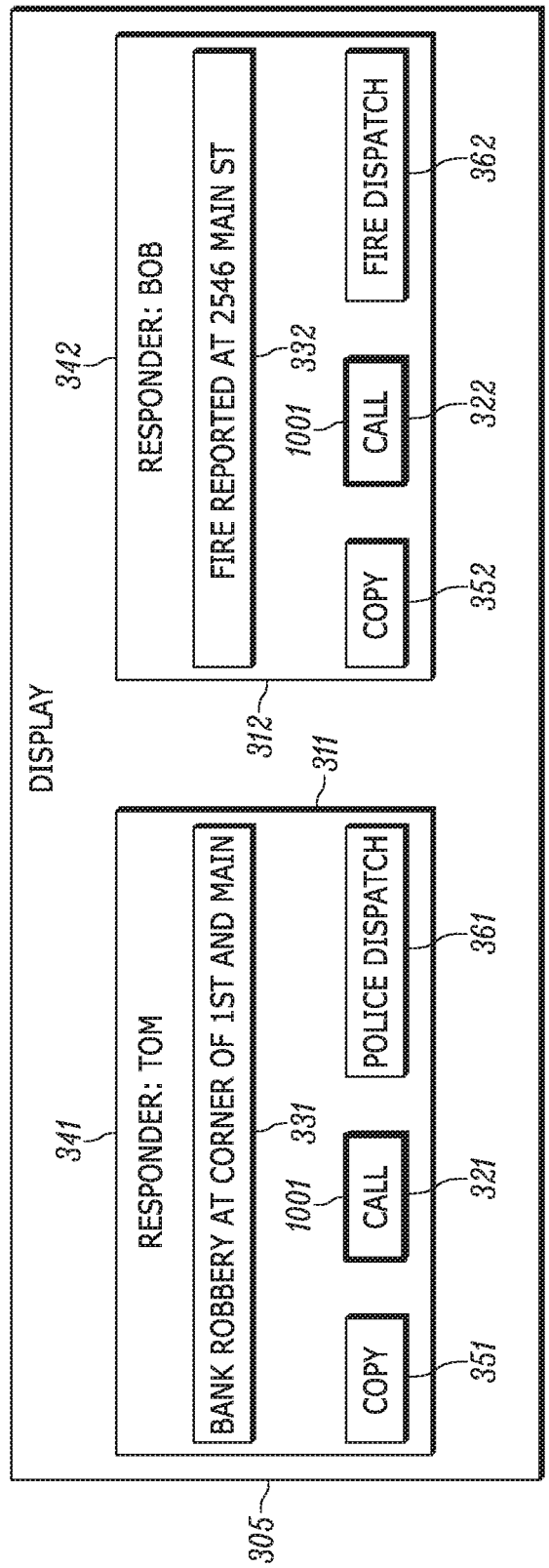
FIG. 10 depicts the associated interfaces of FIG. 3 with example common actuatable option at each of associated actuatable options at each interface, in accordance with some embodiments.

Attention is next directed to FIG. 10 which is substantially similar to FIG. 2, with like elements having like numbers. However, in FIG. 9 it is assumed that the blocks 202, 204, 206, and 208 (and the optional block 207) have been implemented, such that a common actuatable option 1001 has been generated which, when actuated, initiates the actions associated with the actuatable options 321, 322. However, in contrast to the common actuatable options 501, 551, the common actuatable option 1001 has been generated at each of the first actuatable option 321 and the second actuatable option 322, for example as an additional respective virtual button rendered around each of the first actuatable option 321 and the second actuatable option 322. While the actuatable options 351, 352 can be similarly adapted with a surrounding common actuatable option for copying text from both of the fields 331, 332, such embodiments are not depicted for clarity.

In any event, when the common actuatable option 1001 at one or more of the first actuatable option 321 and the second actuatable option 322 is actuated, the actions associated with each of the first actuatable option 321 and the second actuatable option 322 are implemented. In particular, in the embodiments depicted in FIG. 10, actuation of the common actuatable option 1001 occurs when input is received in the region of the display device 305 surrounding one or more of the first actuatable option 321 and the second actuatable option 322; however, when input is received in the region indicated by the first actuatable option 321 and the second actuatable option 322, only the associated actions are implemented. Indeed, in embodiments where the input device is a touch screen, a size of the common actuatable option 1001 can be selected that is compatible for use with a human finger, and the like.

While present embodiments have been described with respect to interfaces that are used for communicating with the devices 103, other types of interfaces are within the scope of present embodiments. For example, interfaces may be identified at one or more display devices for other types of applications, including, but not limited to, mapping applications. For example, attention is directed to FIG. 11 which depicts a first interface 1111, a second interface 1112, rendered at the display device 305, that provide map information in respective fields 1131, 1132, and each having a respective actuatable option 1141, 1142 for implementing a zoom action at the respective maps of the fields 1131, 1132. It is assumed in FIG. 11 that the method 200 has been implemented and hence a common actuatable option 1163 has been generated for implementing the zoom action at each of the respective maps of the fields 1131, 1132. Hence, the common actuatable option 1163 has a label "ZOOM ALL", indicating that actuation thereof will implement a zoom action at each of the respective maps of the fields 1131, 1132.

Hence, described herein a system 100 and/or a communication device 107 comprising: one or more display devices 105; a controller 120 in communication with the one or more display devices 105; a first interface 311 comprising a first actuatable option 321 which, when actuated, initiates a first action, the first actuatable option 321 having a first label; and a second interface 312 comprising a second actuatable option 322 which, when actuated, initiates a second action, the second actuatable option 322 having a second label, wherein the controller 120 dynamically generates a common actuatable option on the one or more display devices 105 based on an association between one or more of: the first label and the second label; and the first action and the second action, wherein the common actuatable option, when actuated, initiates both the first action and the second action.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

I claim:

1. A device for generating common actuatable options that initiate a plurality of actions associated with responders, the device comprising:
 a communication interface;
 and a controller configured for communication with one or more display devices, using the communication interface, the controller further configured to:
  identify, at the one or more display devices, a first interface comprising a first actuatable option which, when actuated, initiates a first action, the first actuatable option having a first label;
  identify, at the one or more display devices, a second interface, different from the first interface, comprising a second actuatable option which, when actuated, initiates a second action, the second actuatable option having a second label;
  determine that the first actuatable option and the second actuatable option are associated by:
   comparing the first action and the second action to determine that each of the first action and the second action initiate communication with respective communication devices; and
   comparing geographic information associated with the first interface and geographic information associated with the second interface to determine that the first interface is associated with a first event, and that the second interface is associated with the first event or a second event that is within a given distance from the first event; and,
  in response to determining that the first actuatable option and the second actuatable option are associated, generate, at the one or more display devices, a common actuatable option which, when actuated, initiates both the first action and the second action, wherein the common actuatable option generated at a third interface different from the first interface and the second interface, or as a stand-alone option outside the first interface and the second interface.

2. The device of claim 1, wherein the controller is further configured to: in response to determining that the first actuatable option and the second actuatable option are associated, generate a request to confirm generation of the common actuatable option; and generate the common actuatable option when a response to the request is received indicative that generation of the common actuatable option is to proceed.

3. The device of claim 1, wherein the communication interface is in further communication with at least a first communication device and a second communication device, the first action comprising initiating a first communication with the first communication device and the second action comprising initiating a second communication with the second communication device.

4. The device of claim 3, wherein the controller is further configured to, in response to one or more of determining that the first actuatable option and the second actuatable option are associated, and the common actuatable option being actuated: generate a talkgroup that includes the first communication device and the second communication device; and, when the common actuatable option is actuated, initiate the first communication and the second communication by initiating a communication with the talkgroup.

5. The device of claim 1, wherein the controller is further configured to:
 identify, at the one or more display devices, a fourth interface, different from the first interface and the second interface, the fourth interface comprising a third actuatable option which, when actuated, initiates a third action, the third actuatable option associated with the first actuatable option and the second actuatable option;
 determine whether the fourth interface is associated with the first interface and the second interface;
 when the fourth interface is associated with the first interface and the second interface, generate, at the one or more display devices, the common actuatable option which, when actuated, initiates all of the first action, the second action and the third action; and,
 when the fourth interface is not associated with the first interface and the second interface, generate, at the one or more display devices, the common actuatable option which, when actuated, initiates the first action and the second action, excluding the third action.

6. The device of claim 1, wherein the common actuatable option comprises a respective label that is substantially similar to the first label and the second label.

7. The device of claim 1, wherein the first interface and the second interface have substantially similar respective configurations, and the controller is further configured to generate at the one or more display devices, the common actuatable option in the third interface, the third interface having a configuration substantially similar to the respective configurations of the first interface and the second interface.

8. A method for generating common actuatable options that initiate a plurality of actions associated with responders, the method comprising:
at a device comprising: a communication interface; and a controller configured for communication with one or more display devices, using the communication interface, identifying, using the controller, at the one or more display devices, a first interface comprising a first actuatable option which, when actuated, initiates a first action, the first actuatable option having a first label;
identifying, using the controller, at the one or more display devices, a second interface, different from the first interface, comprising a second actuatable option which, when actuated, initiates a second action, the second actuatable option having a second label;
determining, using the controller, that the first actuatable option and the second actuatable option are associated by:
comparing the first action and the second action to determine that each of the first action and the second action initiate communication with respective communication devices; and
comparing geographic information associated with the first interface and geographic information associated with the second interface to determine that the first interface is associated with a first event, and that the second interface is associated with the first event or a second event that is within a given distance from the first event; and,
in response to determining that the first actuatable option and the second actuatable option are associated, generating, using the controller at the one or more display devices, a common actuatable option which, when actuated, initiates both the first action and the second action, wherein the common actuatable option generated at a third interface different from the first interface and the second interface, or as a stand-alone option outside the first interface and the second interface.

9. The method of claim 8, further comprising: in response to determining that the first actuatable option and the second actuatable option are associated, generating, at the controller, a request to confirm generation of the common actuatable option; and generating, using the controller, the common actuatable option when a response to the request is received indicative that generation of the common actuatable option is to proceed.

10. The method of claim 8, wherein the communication interface is in further communication with at least a first communication device and a second communication device, the first action comprising initiating a first communication with the first communication device and the second action comprising initiating a second communication with the second communication device.

11. The method of claim 8, further comprising:
identifying, using the controller, at the one or more display devices, a fourth interface, different from the first interface and the second interface, the fourth interface comprising a third actuatable option which, when actuated, initiates a third action, the third actuatable option associated with the first actuatable option and the second actuatable option;
determining, using the controller, whether the fourth interface is associated with the first interface and the second interface;
when the fourth interface is associated with the first interface and the second interface, generating, using the controller, at the one or more display devices, the common actuatable option which, when actuated, initiates all of the first action, the second action and the third action; and,
when the fourth interface is not associated with the first interface and the second interface, generating, using the controller, at the one or more display devices, the common actuatable option which, when actuated, initiates the first action and the second action, excluding the third action.

12. The method of claim 8, wherein the first interface and the second interface have substantially similar respective configurations, and the method further comprises generating, using the controller, at the one or more display devices, the common actuatable option in the fourth interface having a configuration substantially similar to the respective configurations of the first interface and the second interface.

13. A communication device for generating common actuatable options that initiate a plurality of actions associated with responders, the communication device comprising:
one or more display devices;
a controller in communication with the one or more display devices;
a first interface comprising a first actuatable option which, when actuated, initiates a first action, the first actuatable option having a first label; and
a second interface, different from the first interface, comprising a second actuatable option which, when actuated, initiates a second action, the second actuatable option having a second label,
wherein the controller dynamically generates a common actuatable option on the one or more display devices in response to determining that the first actuatable option and the second actuatable option are associated by:
comparing the first action and the second action to determine that each of the first second action and the section action initiate communication with respective devices, and
comparing geographic information associated with the first interface and geographic information associated with the second interface to determine that the first interface is associated with a first event, and that the second interface is associated with the first event or a second event that is within a given distance from the first event; and
wherein the common actuatable option, when actuated, initiates both the first action and the second action, and
wherein the common actuatable option is generated at a third interface different from the first interface and the second interface, or as a stand-alone option outside the first interface and the second interface.

* * * * *

UNITED STATES PATENT AND TRADEMARK OFFICE
CERTIFICATE OF CORRECTION

PATENT NO. : 10,637,988 B2
APPLICATION NO. : 15/645725
DATED : April 28, 2020
INVENTOR(S) : Lee M. Proctor It is certified that error appears in the above-identified patent and that said Letters Patent is hereby corrected as shown below:

In the Claims

Column 18, Line 20, Claim 1, "option generated at a third interface different from" should read --option is generated at a third interface different from--

Column 19, Lines 45 and 46, Claim 8, "action, wherein the common actuatable option gener-ated" should read --action, wherein the common actuatable option is gener-ated--

Column 20, Line 50, Claim 13, "determine that each of the first second action and the" should read --determine that each of the first action and the--

Signed and Sealed this
Second Day of July, 2024

Katherine Kelly Vidal
*Director of the United States Patent and Trademark Office*